United States Patent [19]

Bauer et al.

[11] 4,261,074

[45] Apr. 14, 1981

[54] WINDSHIELD WIPER

[75] Inventors: Kurt Bauer, Ingersheim; Wilhelm Dorr; Alfred Kohler, both of Bietigheim-Bissingen; Oldrich Krizek, Ingersheim; Hans Prohaska, Bietigheim-Bissingen, all of Fed. Rep. of Germany

[73] Assignee: ITT Industries, Inc., New York, N.Y.

[21] Appl. No.: 23,713

[22] Filed: Mar. 26, 1979

[30] Foreign Application Priority Data

Mar. 22, 1978 [DE] Fed. Rep. of Germany ....... 2812413

[51] Int. Cl.³ .............................................. B60S 1/02
[52] U.S. Cl. .................................. 15/250.32; 15/250.35
[58] Field of Search ............ 15/250.32, 250.35, 250.31

[56] References Cited

U.S. PATENT DOCUMENTS

| 1,445,473 | 2/1923 | Beagle | 15/250.32 X |
| 1,947,185 | 2/1934 | Browett | 15/250.32 |
| 2,711,553 | 6/1955 | O'Shei | 15/250.35 |
| 3,163,877 | 1/1965 | Wubbe | 15/250.32 |

FOREIGN PATENT DOCUMENTS

| 1505438 | 6/1969 | Fed. Rep. of Germany | 15/250.32 |
| 1414690 | 9/1965 | France | 15/250.32 |

*Primary Examiner*—Christopher K. Moore
*Attorney, Agent, or Firm*—James B. Raden; Donald J. Lenkszus

[57] ABSTRACT

A windshield wiper assembly is disclosed which includes a pivot pin between the side walls of the main yoke. A connecting element for a wiper arm is mounted on the yoke. The wiper arm projects from the back of the main yoke and is bent such that it laterally extends beside the wiper blade.

5 Claims, 27 Drawing Figures

WINDSHIELD WIPER

BACKGROUND OF THE INVENTION

1. Field of the Invention

The invention relates to windshield wiper assemblies.

2. Description of the Prior Art

In most of the windshield wipers used today, the wiper arm is locked with a connecting member which is mounted on a pivot pin secured between the side walls of the main yoke. The wiper arm is located above the yoke system of the wiper blade. The advantage of these wiper assemblies having a central attachment is that the pitching and twisting moments of the wiper blade are reliably controlled because the guide between arm and blade is relatively long and stable.

Other windshield wipers are known wherein the wiper arm is fastened on a profiled pin laterally projecting from the wiper blade. In these embodiments, the wiper arm extends lateral to the wiper blade in a plane imagined to extend through the axis of the pin in longitudinal direction to the wiper blade. These embodiments are preferred primarily for styling reasons. They are also advantageous, since because of their low overall height, they do not easily lift from the windshield at higher driving speeds. However, due to the lateral articulation of the wiper blade on the wiper arm, these wiper assemblies are disadvantageous with respect to stability.

SUMMARY OF THE INVENTION

A windshield wiper assembly in accordance with the principles of the invention includes a wiper arm bent in a way that it extends laterally beside the wiper blades and is coupled to a pivot pin supported between the side walls of the main wiper yoke.

In one embodiment of the invention, a connecting element serves to connect the wiper arm to the pivot pin and the connecting element is bent sideward and downward such that the wiper arm extends below the plane formed by the axis of the pivot pin in the longitudinal direction of the wiper arm.

BRIEF DESCRIPTION OF THE DRAWINGS

The invention may be better understood from a reading of the following detailed description in conjunction with the drawings in which.

DETAILED DESCRIPTION OF THE DRAWINGS

Figure 1:
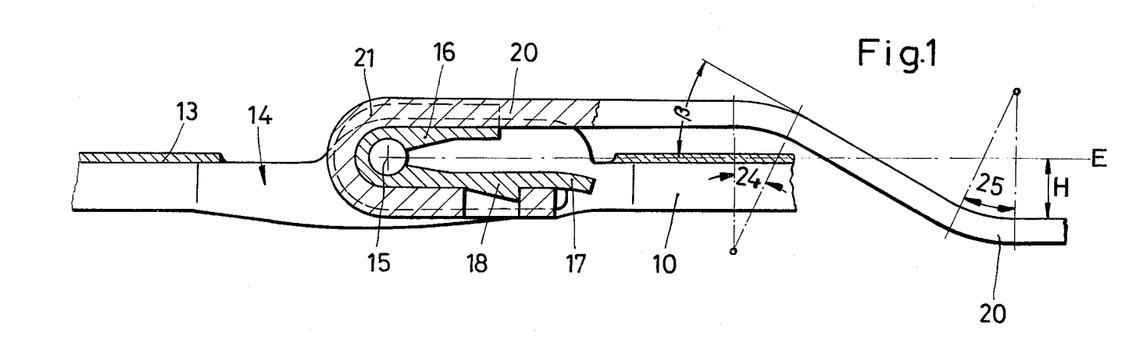
FIGS. 1 and 2 are sectional side and top views of a first embodiment of the invention.
Figure 2:
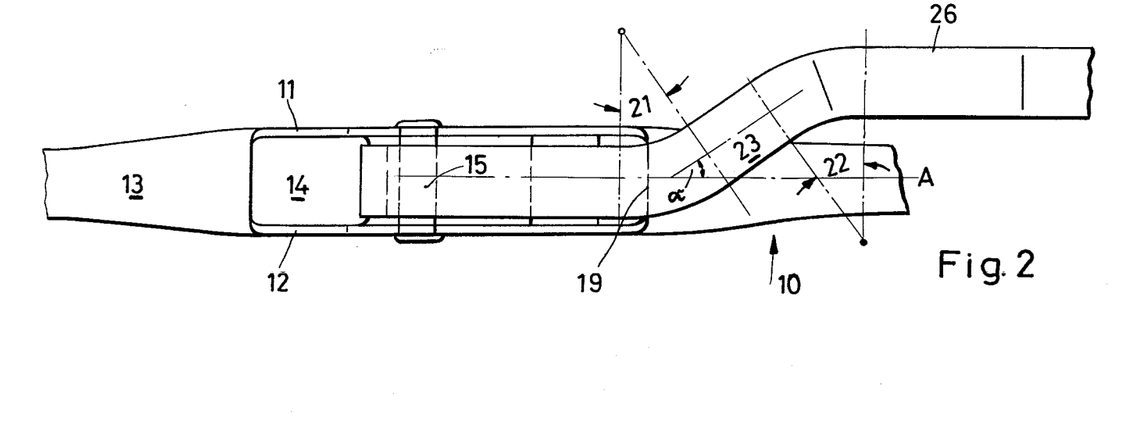
Figure 3:
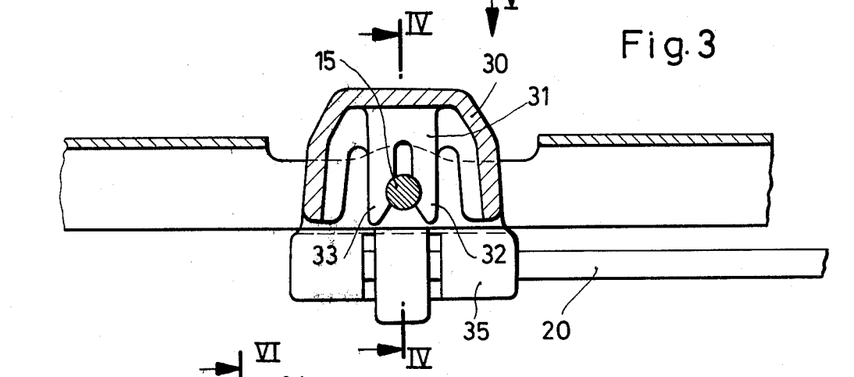
FIG. 3 is a longitudinal section view of a second embodiment of the invention.

The windshield wiper according to FIGS. 1 and 2 consists of a wiper blade not shown in detail with a conventional main yoke 10 having two parallel side walls 11 and 12 and a back 13 with an aperture 14. In the area of the aperture 14, a pivot pin 15 is secured between the side walls 11 and 12.

A known two-legged locking spring 16 serves as a connecting element. One leg 17 of said spring has a detent 18. The locking spring 16 is locked to the pivot pin 15. The wiper arm, as a whole designated by 20, has a hook-shaped end 21 and is connected with the locking spring 16 in known manner. From FIGS. 1 and 2, it can be seen that the wiper arm is centrally fastened to the main yoke between the side walls 11 and 12 of the main yoke 10 thereby ensuring a lateral guide free from play so that pitching moments around the longitudinal axis of the wiper blade as well as twisting around an axis vertically extending to the pane to be cleaned are reliably absorbed.

In this embodiment, the design of the wiper arm 20 is essential. The wiper arm projects through the aperture 14 of the main yoke 10 in an upward direction and above the edge 19 of the aperture 14 in the angular area 21 which has a first sideward bending. The place of this bending is selected such that the wiper arm 20 covers the aperture 14 beginning at the moving joint on the pivot pin 15. This bending is followed by a wiper arm portion 23 which forms an angle $\alpha$ not equal to 90° with the longitudinal axis A of the wiper blade. This arm is again bent in the angular area 22. The bending in the angular area 22 is matched to the lateral bending in the area 21 in a way that the following wiper arm portion extends substantially parallel to the longitudinal direction of the wiper blade.

Additionally, the wiper arm has a downward bending in the area of the angle 24. The areas of the angles 22 and 24 are partly overlapping.

Finally, the wiper arm 20 has a further bending in the angular area 25 such that the wiper arm extends parallel to the pane to be cleaned. The bendings in the angular areas 24 and 25 are adjusted to each other in a way that in the portion 26 following these areas, the wiper arm extends below an imaginary plane E through the pivot pin axis in longitudinal direction of the wiper blade at a spacing H. The portion between the bendings in the angular areas 24 and 25 extends at an angle $\beta$ less than 90° with respect to said plane 4. Rectangular bendings could also be provided. The relatively smooth bendings are preferred for styling reasons.

Thus, in the embodiment according to FIGS. 1 and 2, the wiper arm 20, although centrally attached between the side walls of the main yoke, is positioned laterally of to the wiper blade and below the plane E. Such an embodiment combines the advantages with respect to stability and appearance of the initially-mentioned windshield wipers but does not include their disadvantages.

Although the first sideward bending may instead be provided in an area above the hinge of the clawed yoke (not shown in the drawing) on the main yoke, it is advantageous to bend the wiper arm shortly behind the moving joint so that over substantially the entire wiper blade length the overall height of the wiper blade is only determined by how the wiper blade is built up.

In a second embodiment according to FIGS. 3 to 6, the connecting element 30 consists of a locking element 31 having two clip-shaped legs 32 and 33, a web 34 overlapping the side wall 11 of the main yoke and an adapter member 35 with an inserting channel 36 for a wiper arm 20 with a straight end. The connecting element 30 is locked to be swivelled on the pivot pin 15.

One wall 37 of the inserting channel 36 is resilient and has a cam 38 which laterally engages a recess 39 on the wiper arm 20. Thus, the wiper arm 20 is rigidly locked with the adapter member 35.

Figure 6:
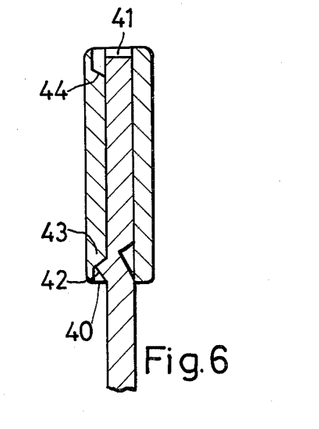
FIG. 6 is a section view taken along line VI—VI of FIG. 5.

As especially apparent from FIG. 6, the inserting channel 36 is provided with openings 40 and 41 on both sides so that the connecting element 30 can be used for wiper blades to be articulated to the left side of the wiper arm as well as for those to be articulated to the right side of the wiper arm.

The wiper arm 20 has an embossed projection 42 cooperating with stops 43 and 44 in a way that insertion of the wiper arm 20 in the inserting channel 36 is limited.

Figure 7:
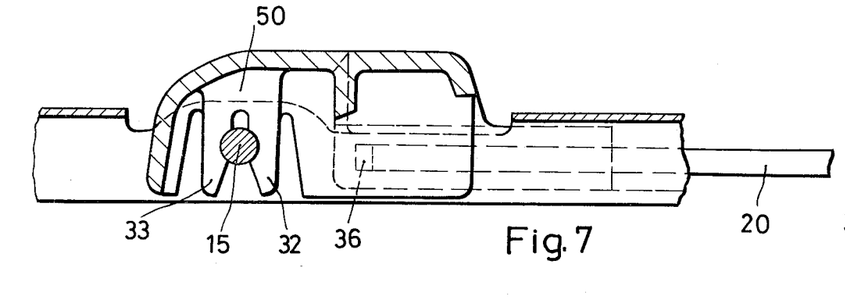
FIGS. 7–9 are side sectional, end sectional, and top views, respectively, of a third embodiment of the invention.
Figure 8:
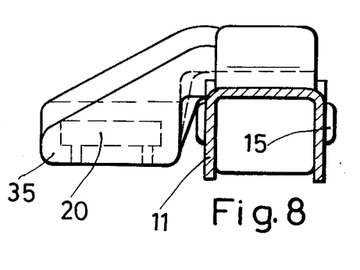
Figure 9:
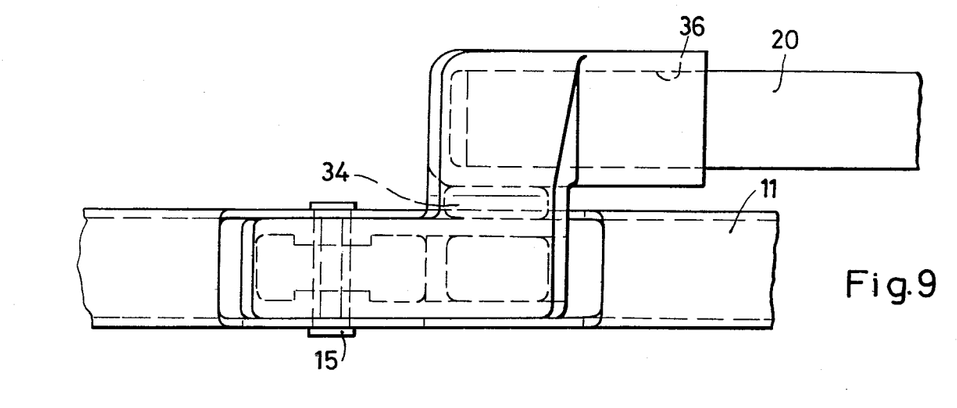

The connecting element 50 according to FIGS. 7 to 9 differs from the above-described embodiment in that the inserting channel 36 is closed on one side and the adapter portion 35 is elongated in the longitudinal direction of the wiper blade in a way that the wiper arm ends at a spacing in front of the pivot pin axis. In contrast thereto, the adapter portion 35 of the embodiment according to FIGS. 3 to 6 is arranged laterally to the pivot pin 15.

Figure 4:
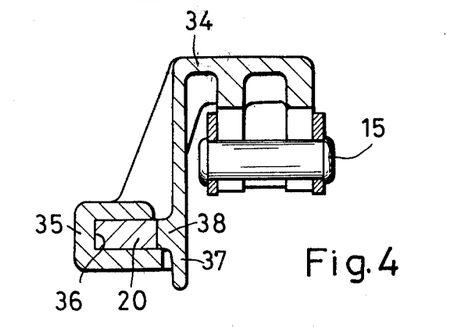
FIG. 4 is a section view taken along line IV—IV of FIG. 3.
Figure 5:
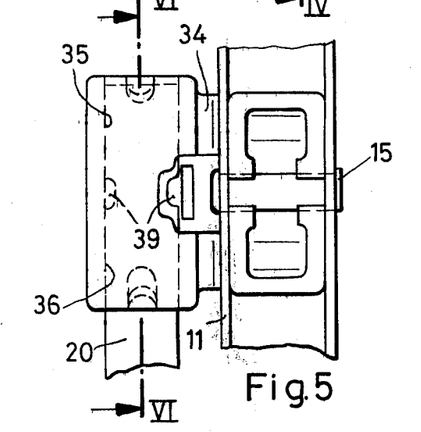
FIG. 5 is a view of the embodiment of FIG. 3 in the direction of arrow V.

In contrast to the embodiments according to FIGS. 1 and 2, the connecting element rather than the wiper arm is bent sidewards and downwards such that, although there is central attachment between the side walls of the main yoke, the wiper arm again extends laterally to the wiper blade and—as FIG. 4 shows—below the already-mentioned plane E. The locking connection between the connecting element and the pivot pin, as well as the connection between the adapter member and the wiper arm, can be modified as required. For instance, the adapter portion could be suitable to articulate a hooked wiper arm.

Figure 10:
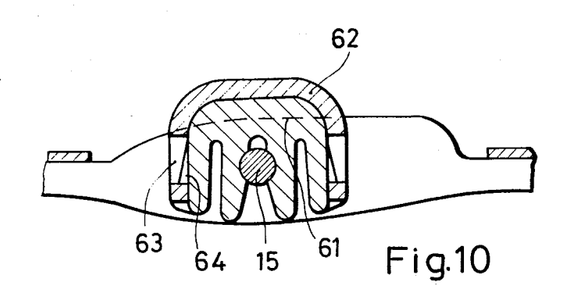
FIGS. 10–12 are side sectional, end sectional and top views, respectively, of a fourth embodiment of the invention.
Figure 11:
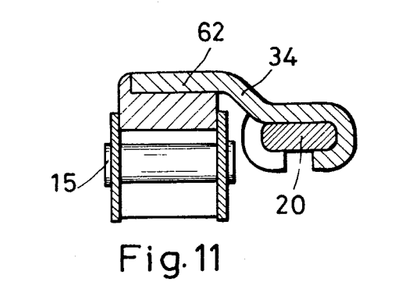
Figure 12:
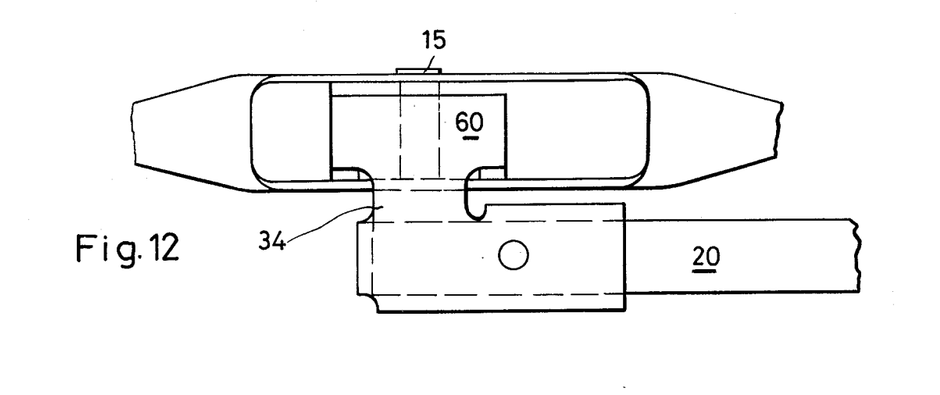

FIGS. 10 to 12 show another alternative according to the same principle in which the connecting element is partly made of metal for grounds of stability. Over a plastic member 61 locked on the pivot pin 15, a yoke 62 is slipped, the side walls of which are provided with recesses 63 into which the locking cams 64 of the plastic member 61 are engaged. The yoke 62 at a spacing overlaps the one side wall 11 of the main yoke 10 and then ends in an adapter member for the purpose of locking with wiper arm 20.

FIGS. 13 to 26 show embodiments in which the connecting element is unmovably held between the side walls 11 and 12 of the main yoke, and whereby the pivot pin 15 is used for the attachment. The connecting element has a laterally projecting profiled pin 69 for the purpose of putting a correspondingly designed wiper arm on it. Thus, these embodiments include the advantage that standard wiper blades can be articulated to standard wiper arms having another fastening principle via suitable connecting elements centrally secured between the side walls of the main yoke.

Figure 13:
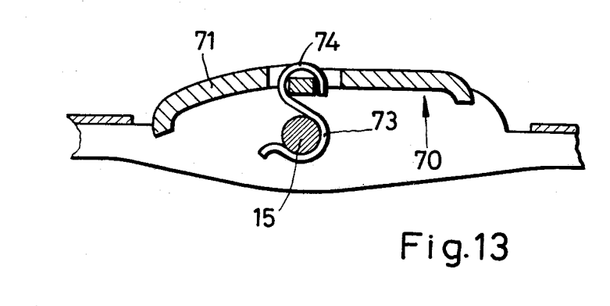
FIGS. 13–15 are side sectional, end sectional and top views, respectively, of a fifth embodiment of the invention.
Figure 14:
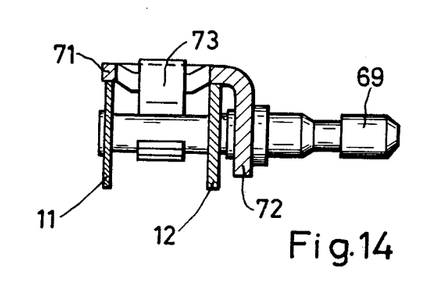
Figure 15:
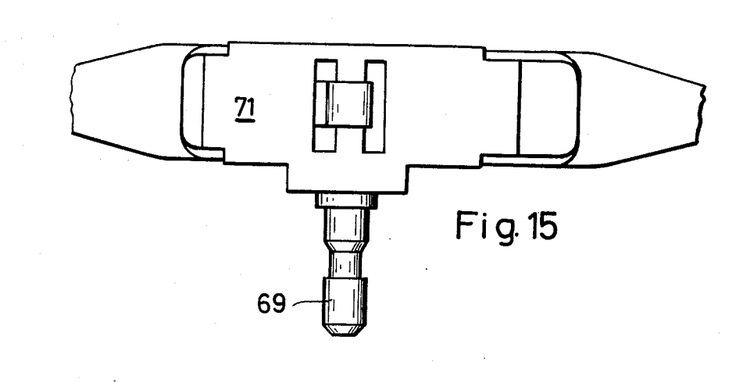

In the embodiment according to FIGS. 13 to 15, the connecting element 70 consists of a sheet metal angle, the one leg 71 of which on both sides rests upon the front edges of the side walls 11 and 12 of the main yoke 10. On the other leg 72, the profiled pin 69 is riveted. An S-shaped spring 73 is conencted to web 74 on the leg 71 and to the pivot pin 15 and serves as a locking element between the connecting element and the pivot pin 15.

Figure 16:
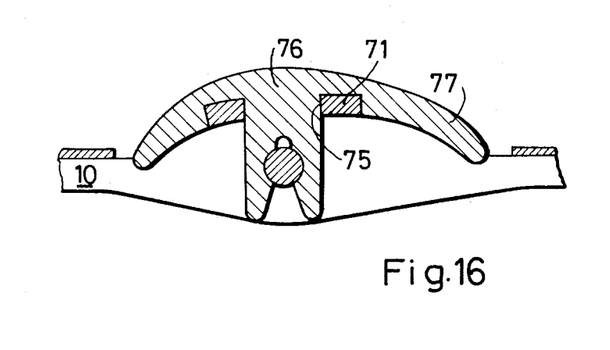
FIGS. 16–18 are side sectional, end sectional and top views, respectively, of a sixth embodiment of the invention.
Figure 17:
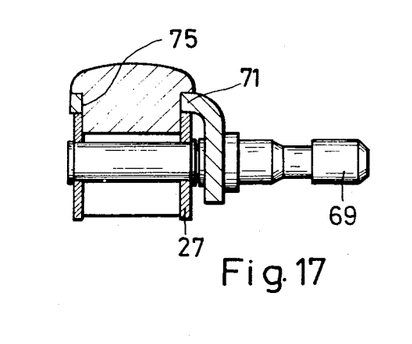
Figure 18:
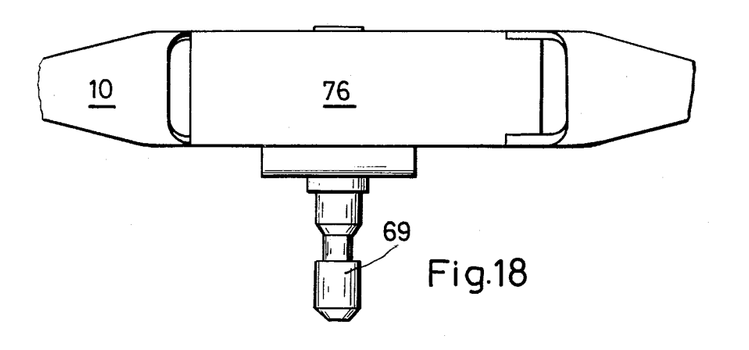

In the embodiment according to FIGS. 16 to 18, the one leg 71 has an aperture 75 through which a mushroom-shaped locking element 76 is inserted and which locks on the pivot pin 15. The head 77 of said locking element covers the aperture 14 on the back of the main yoke.

Figure 19:
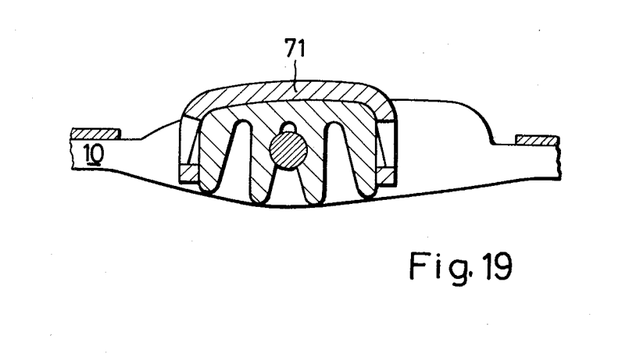
FIGS. 19–21 are side sectional, end sectional and top views, respectively, of a seventh embodiment of the invention.
Figure 20:
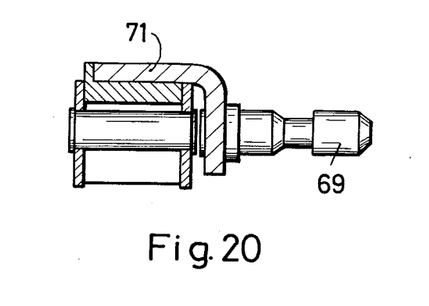
Figure 21:
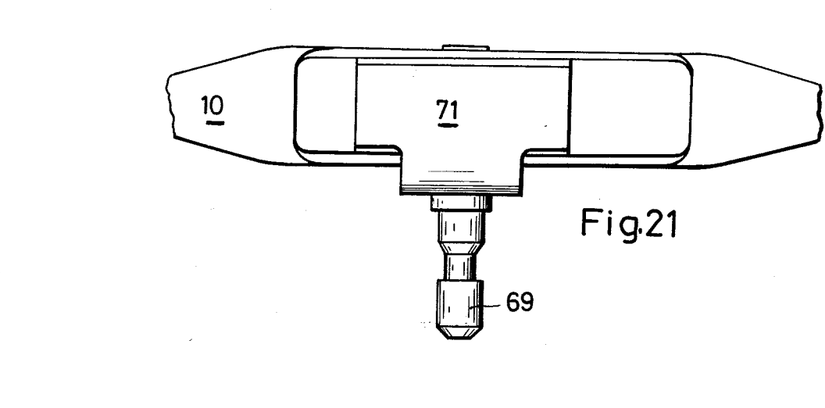

The embodiment according to FIGS. 19 to 21 approximately corresponds to that of FIGS. 10 to 12.

Figure 22:
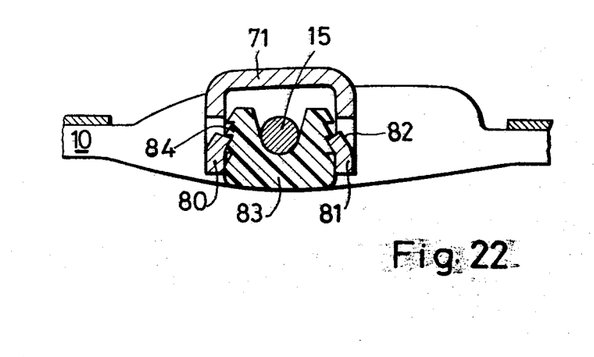
FIGS. 22–24 are side sectional, end sectional and top views, respectively, of an eighth embodiment of the invention.
Figure 23:
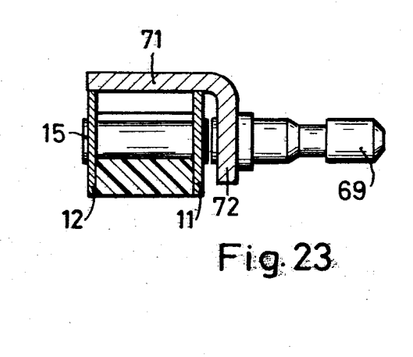
Figure 24:
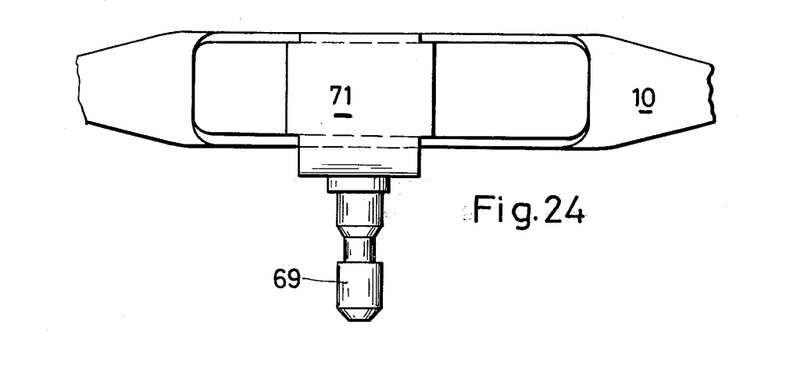

In the embodiment according to FIGS. 22 to 24, the one leg 71 has two laterally projecting flanges 80 and 81 with embossed detents 82. A locking element 83 supports the pivot pin 15 from the underside. The locking element has sawtoothed locking studs 84 cooperating with the detents 82.

Figure 25:
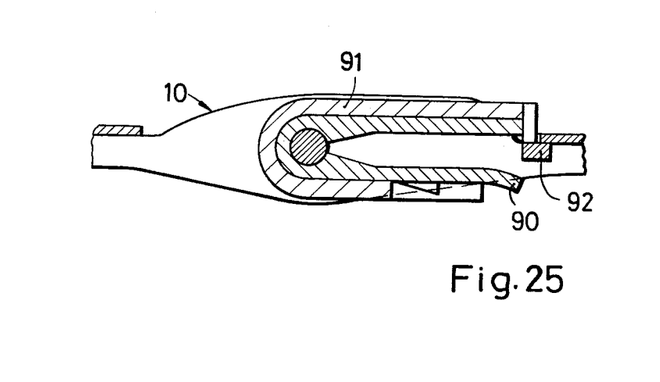
FIGS. 25–27 are side sectional, end sectional and top views, respectively, of a ninth embodiment of the invention.
Figure 26:
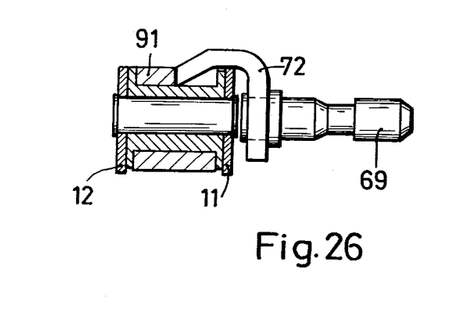
Figure 27:
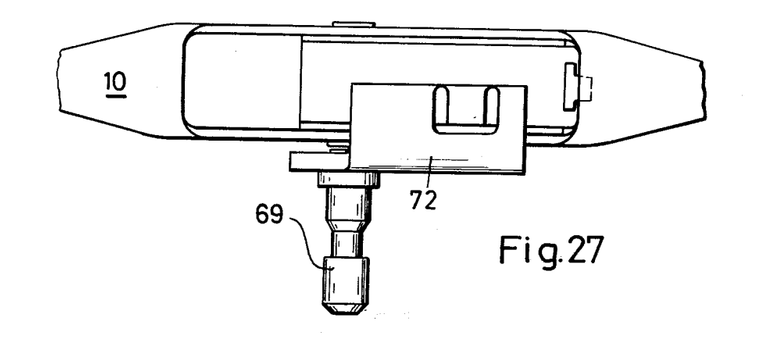

In the embodiment according to FIGS. 25 to 27, a two-legged locking spring 90 serves as locking element. A leg 91 bent in a hook-shaped manner may be locked with said locking spring. A locking lug 92 grips below the back of the main yoke to unmovably hold the locking element together with the connecting element on the main yoke.

What is claimed is:

1. A windshield wiper assembly comprising:
   a wiper blade having a main yoke for a wiper element, said main yoke having a pair of side walls and a back wall, said back wall having an aperture;
   a pivot pin between said side walls;
   a wiper arm;
   a connecting element for connecting said wiper arm to said pivot pin to permit swivelling movement of said wiper blade relative to said wiping arm, said wiper arm including a first portion projecting from said aperture in a direction parallel to said wiper blade, characterized in that said wiper arm has a first bending in a sideward direction a predetermined distance from said pivot pin, a second bending in a downward direction, a third bending equal to and extending in the opposite direction from said first bending at a second predetermined distance from said pivot pin such that a second portion of said wiper arm extends parallel to and laterally beside said wiper blade, and a fourth bending equal to and extending in an opposite direction to said second bending such that said wiper arm is parallel to at least a portion of the pane to be cleaned.

2. A windshield wiper assembly according to claim 1, wherein said wiper arm includes a third portion intermediate said first and second portions, said third portion extending below an imaginary plane extending through the axis of said pivot pin in the longitudinal direction of said wiper blade.

3. A windshield wiper according to claim 1, wherein said wiper arm includes a portion between said first and third bendings and said portion is disposed at an angle not equal to 90° to the longitudinal axis of said wiper blade.

4. A windshield wiper assembly according to claim 1, wherein said wiper arm includes a hook-shaped end portion, and said connecting element comprises a two-legged locking spring, said hook-shaped portion being adapted to receive said spring, and said spring being adapted to engage said pivot pin such that longitudinal movement of said wiper relative to said wiper blade is prevented and rotational movement of said wiper arm in a plane perpendicular to the axis of said pivot pin is permitted.

5. A windshield wiper assembly comprising:
- a wiper blade having a main yoke for a wiper element, said main yoke having a pair of side walls and a back wall;
- a pivot pin coupled to said main yoke;
- a wiper arm;
- means for connecting an end portion of said wiper arm to said pivot pin such that relative movement between said wiper arm and said main yoke is restricted to one plane of motion;
- said wiper arm including a first portion adjacent said end portion, a second portion and a portion intermediate said first and second portions, said first portion being laterally positioned adjacent said back wall of said yoke in a first plant substantially parallel to the longitudinal direction of said wiper blade, said second portion being laterally positioned adjacent one of said side walls in a second plane positioned below and substantially parallel to said first plane, said intermediate portion connecting said first and second portions.

* * * * *